United States Patent [19]

Wada

[11] Patent Number: 5,703,850
[45] Date of Patent: Dec. 30, 1997

[54] DATA RETRIEVAL SYSTEM AND METHOD WITHIN A CONSTANT ANGULAR VELOCITY CD-ROM

[75] Inventor: Takeo Wada, Tokyo, Japan

[73] Assignee: Cirrus Logic, Inc., Freemont, Calif.

[21] Appl. No.: 666,776

[22] Filed: Jun. 18, 1996

[51] Int. Cl.$^6$ ............................................. G11B 5/09
[52] U.S. Cl. .............................. 369/47; 369/124; 369/50
[58] Field of Search ............................ 369/47, 50, 124, 369/32

[56] References Cited

U.S. PATENT DOCUMENTS 4,321,706  3/1982  Craft ........................................ 375/295

*Primary Examiner*—Nabil Hindi
*Attorney, Agent, or Firm*—Wagner, Murabito & Hao

[57] ABSTRACT

A method and system retrieving data stored on a compact disk read only memory (CD-ROM) device using the constant angular velocity (CAV) reading technique. Unlike the constant linear acceleration (CLA) reading technique, in the CAV reading technique the data retrieval rates of the CD-ROM read head vary depending on the radius of the annular recording track that is being read. Data rates can be as much as 2.5× faster for the outer recording tracks compared to the inner recording tracks. The novel system utilizes a narrow capture band phase lock loop circuit in conjunction with a microcontroller which controls the center frequency supplied to the phase lock loop circuit. The microcontroller adjusts the center frequency of the phase lock loop circuit depending on the track (e.g., radius) position of the read head of the CD-ROM device. With the center frequency adjusted close to the data rate of the current track, the phase lock loop circuit needs only a narrow capture band to accurately retrieve the read reference clock from the current track. In one embodiment, the microcontroller is aware of the read head position because it controls read head movement. A microcontroller controlled programmable oscillator (e.g., synthesizer) is used in one embodiment of the novel system to generate the required center frequencies. Direct computation or a look-up table based on the read head position can be used by the microcontroller to determine the required center frequencies. A decoder is supplied with the read reference clock for data decoding.

18 Claims, 8 Drawing Sheets

| HEAD POSITION | CENTER FREQUENCY | |
|---|---|---|
| $r_0$ (INNER) | 17.3 MHz = $f_0$ | 605 |
| $r_1$ | 17.39 MHz = $f_1$ | 610 |
| $r_2$ | 17.48 MHz = $f_2$ | 615 |
| | ⋮ | |
| $r_i$ | $f_i$ | 620 |
| | ⋮ | |
| $r_{255}$ | 40 MHz = $f_{255}$ | 625 |

DATA RETRIEVAL SYSTEM AND METHOD WITHIN A CONSTANT ANGULAR VELOCITY CD-ROM

FIELD OF THE INVENTION

The present invention relates to the field of data retrieval in a compact disk read only memory (CD-ROM) device. More specifically, the present invention relates to the field of data retrieval in a constant angular velocity reading technique (CAV) CD-ROM device.

BACKGROUND OF THE INVENTION

Today, digital information can be stored optically on compact disks (CDs) often referred to as "optical disks." The digital information maintained in this optical disk storage medium is stored optically in annular but spiral shaped tracks that are positioned at different radii from the center of the optical disk medium. The digital information is read from the optical disk medium by a CD player which contains a read head that is positioned over the tracks of the rotating optical disk medium. Computer controlled CD players that are used to retrieve digital information for use by the computer system are called CD-ROM (read only memory) players and the optical disks for such use are often called CD-ROM optical disks.

Currently, there is one accepted standard for recording digital information onto a CD-ROM disk. The data is recorded using a constant linear velocity format (CLV, see below) so that data density recorded per linear inch of the CD-ROM is constant. However, there are two accepted techniques for reading digital information from an optical disk medium during playback on a CD-ROM player. The first technique is the constant linear velocity (CLV) technique and the second technique is the constant angular velocity (CAV) technique. In both techniques, the density (e.g., bits/inch) of the information stored within the tracks is constant. In CLV technique, as the read head of the CD-ROM player moves from the inner tracks of the optical disk medium to the outer tracks, the rotation speed of the optical disk medium is decreased by the CD-ROM player to maintain a constant linear velocity of the read head with respect to the recorded information. The rotation speed is decreased because the circumference of the outer tracks is larger than the circumference of the inner tracks. By decreasing the rotation speed, the linear velocity, and therefore the data rate, is held constant in the CLV reading technique. Conversely, in the CAV reading technique, the rotation speed of the optical disk medium is held constant regardless of the track position of the read head. Therefore, in the CAV reading technique, the data rate of digital information picked up by the read head increases as the read head travels from the inner tracks of the optical disk medium to the outer tracks.

Although adequate for playing back continuously recorded audio/visual digital files, the CLV reading technique is not particularly advantageous for retrieving recorded computer information that is accessed at random positions within the optical disk medium (e.g., "random accessed" information). For instance, in contrast to random accessed information, a recorded audio/visual digital file is typically accessed continuously during playback with the read head moving continuously from the inner tracks to the outer tracks (or vice-versa) as the file progresses. In an audio/visual file there are few occasions for the read head to "seek" (e.g., move a distance) from one track position to another. In contrast, random accessed information within the optical disk medium requires a large number of "seeks" during the retrieval process.

During a "seek" command, the read head of the CD-ROM player is instructed to move from its current position to a new position in order to retrieve recorded information from the optical disk medium. In the CLV reading technique, the rotation speed of the optical disk medium must be adjusted based on the new track position of the read head. Therefore, reading random accessed information from an optical disk medium in the CLV reading technique requires many adjustments to the rotation speed of the optical disk medium.

FIG. 1A and FIG. 1B, respectively, illustrate the velocity of the read head and the optical disk rotation speed over time, in response to a seek command. As shown by FIG. 1A and FIG. 1B (in the CLV reading technique), while the read head can be rapidly positioned from its current position to a new (e.g., target) position, it takes longer for the spindle motor of the CD-ROM player to reach the target rotation speed. For instance, FIG. 1A is a graph illustrating read head velocity versus time for a CD player using the CLV reading technique. Curve 10 of FIG. 1A illustrates that in a typical application, following a seek command received at time=$t_0$, the CD player requires approximately 100 ms to perform a rough seek operation 30 followed by an average of 25 ms to perform a fine seek (curve 12) to reach the new read head position (e.g. the target position). FIG. 1B is a graph of rotation speed versus time for a CD player using the CLV reading technique. As shown by curve 50, during the full acceleration period 55 of the spindle motor, the rotation speed changes the most. However, the target rotation speed (position 70) is not reached until approximately 150 ms after the seek command is received (at time=$t_0$). Therefore, in the CLV reading technique, the CD player takes approximately 25 ms longer to reach the target rotation speed after obtaining the target read head position (see FIG. 1A).

As result, the CLV reading technique is disadvantageous for random accessed recorded computer information because this information requires many seek commands during retrieval; for each seek, the access time is increased due to the additional time required for the CD player spindle motor to reach the target rotation speed. Moreover, because the rotation speed of the optical disk medium varies based on the read head position, the CD player using the CLV technique requires an advanced speed controllable spindle motor with costly associated control circuitry. Lastly, because the CD player using the CLV reading technique is constantly accelerating its spindle motor (FIG. 1B), torque is required during playback of CD-ROMs using the CLV reading technique, which increases the overall power consumption of the CD player. This makes the CLV reading technique disadvantageous for battery operated (e.g., portable laptop) computer systems that have limited power stores and are extremely heat sensitive.

Recent developments in CD player technology have attempted to provide a workable CD-ROM player for the CAV reading technique. However, due to wide variations (e.g., 2.5×) in the data rates from the inner tracks to the outer tracks of the optical disk medium, a relatively complex and expensive phase lock loop circuit has been used. However, even the most complex phase lock loop circuits are capable of only responding to data rates (e.g., frequencies) within a capture band of +/− (50–100)% of the phase lock loop circuit's fixed reference frequency. Therefore, prior art CAV CD-ROM players are not capable of retrieving data across the entire optical disk medium because the capture band of their phase lock loop circuit is too limited. Further, prior art CAV CD-ROM players are relatively expensive because as the capture band of the phase lock loop circuit is increased, the overall cost and complexity of the phase-lock loop circuit increases.

Accordingly, what is needed is a CD-ROM player that effectively and efficiently retrieves random accessed digital information stored on an optical disk medium that does not require additional time over the time required to position the read head to a new track position. Further, what is needed is a CD-ROM player that does not require an advanced and costly spindle motor with associated costly spindle control circuitry. What is also needed is a CD-ROM player whose spindle motor does not require torque (and therefore consume power) each time a new seek command is issued. What is also needed is a CD-ROM player that offers the above advantages and requires an inexpensive phase lock loop circuit that is readily available. As described below, the present invention offers these advantageous capabilities and others not recited above but made clear within discussions of the present invention to follow.

SUMMARY OF THE INVENTION

A method and system are described for retrieving data stored on a compact disk read only memory (CD-ROM) device using the constant angular velocity (CAV) reading technique. Unlike the constant linear acceleration (CLV), in the CAV reading technique, the data retrieval rates of the CD-ROM read head vary depending on the radius of the annular (but spiral) recording track that is being read. For different tracks, the read head moves at different linear velocities across the CD-ROM disk because the circumference of the outer tracks is larger than the inner tracks and the rotation period of the CD-ROM disk is constant. Data rates can be as much as 2.5× faster for the outer recording tracks compared to the inner recording tracks. The novel system utilizes an expensive narrow capture band phase lock loop circuit in conjunction with a microcontroller which controls the center frequency supplied to the narrow capture band phase lock loop circuit. The microcontroller adjusts the center frequency of the phase lock loop circuit depending on the track position (e.g., radius) of read head of the CD-ROM device. With the center frequency adjusted to be close to the data rate of the current track, the phase lock loop circuit needs only a narrow capture band to accurately retrieve the read reference clock from the current track. In one embodiment, the microprocessor is aware of the read head position because it controls read head movement. A microcontroller controlled programmable oscillator (e.g., synthesizer) is used in one embodiment of the novel system to generate the required center frequencies. Direct computation or a look-up table based on the read head position can be used by the microcontroller to determine the required center frequencies. A decoder is supplied with the read reference clock for data decoding to the host system.

Specifically, embodiments of the present invention include, an information retrieval system comprising: a read head for reading recorded encoded digital information of off a CD-ROM optical disk and for supplying the encoded information, the encoded information read and supplied at variable data rates depending on track positions of the read head; a microcontroller for controlling the track positions of the read head and for determining variable center frequencies based on the track positions, the variable center frequencies being close in frequency to the data rate of the encoded information at corresponding track positions; a programmable oscillator coupled to the microcontroller for generating the variable center frequencies determined by the microcontroller; a narrow capture band phase lock loop circuit coupled to receive the variable center frequencies from the programmable oscillator and coupled to receive the encoded information, the narrow capture band phase lock loop circuit for extracting read reference clock signals from the encoded information; and a data decoder circuit coupled to receive the encoded information and coupled to receive the read reference clock signals, the data decoder circuit for generating decoded information based on the encoded information and the read reference clock signals. Embodiments of the present invention also include a method implemented in accordance with the above.

BRIEF DESCRIPTION OF THE DRAWINGS

FIG. 7 illustrates a look-up table utilized by the microcontroller in one embodiment of the present invention.

DESCRIPTION OF THE PREFERRED EMBODIMENTS

The present invention provides an information retrieval system for a CAV CD-ROM device using a narrow capture band phase lock loop circuit that is supplied with variable center frequency signals. The variable center frequency signal of the present invention is microcontroller controlled to be near the data rate of the currently read track of a CD-ROM optical disk. In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as to not unnecessarily obscure aspects of the present invention.

VARIABLE DATA RATE

Figure 1A:
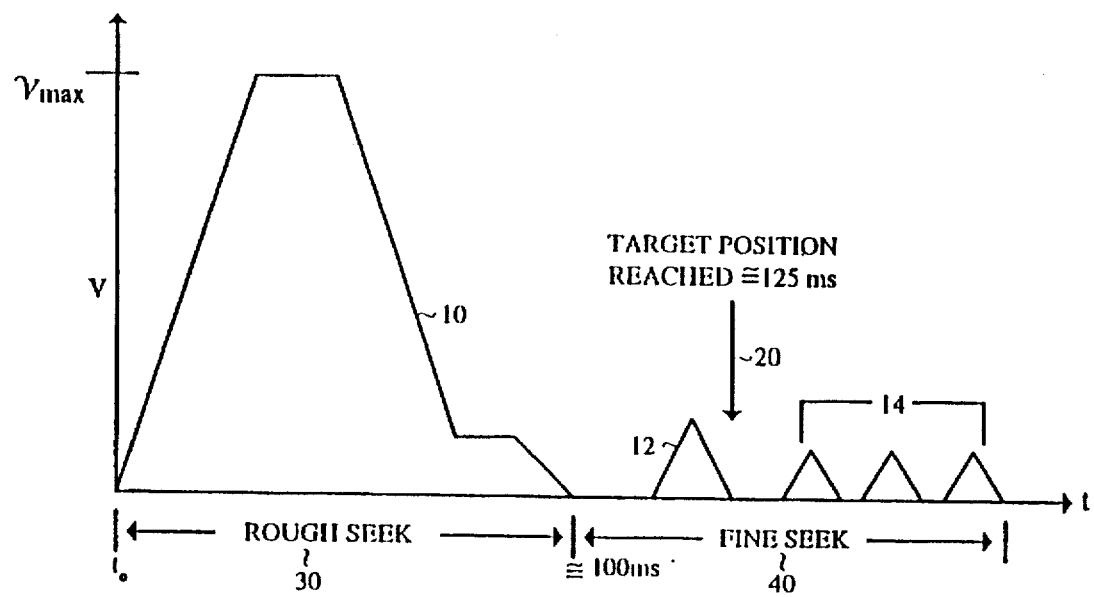
FIG. 1A is a graph illustrating head movement velocity over time during a seek command for a CD-ROM player using the CLV reading technique.
Figure 1B:
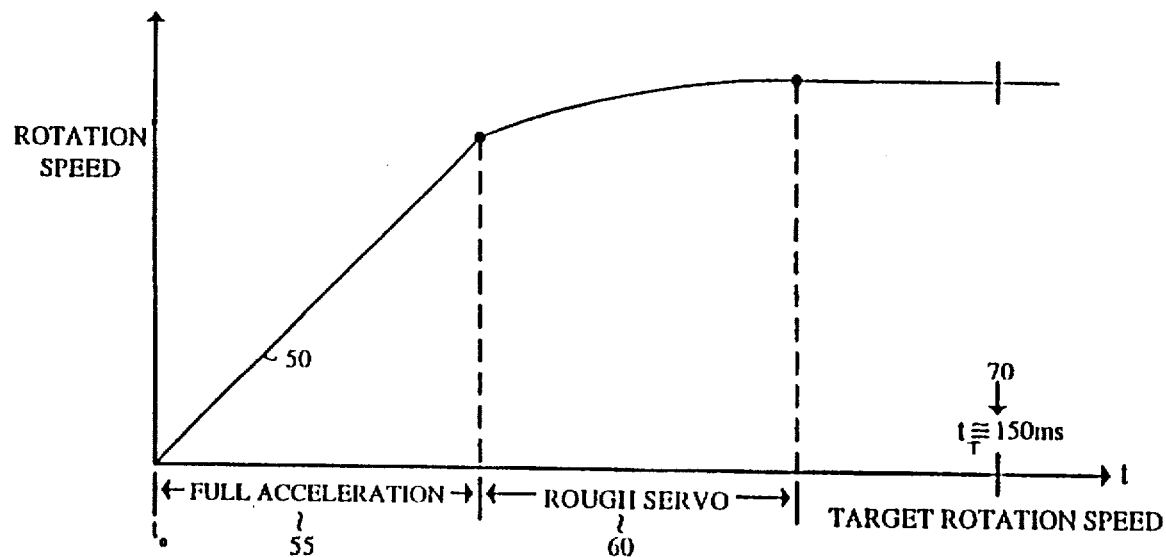
FIG. 1B is a graph illustrating spindle rotation speed over time during the seek command of FIG. 1A for a CD-ROM player using the CLV reading technique.
Figure 2:
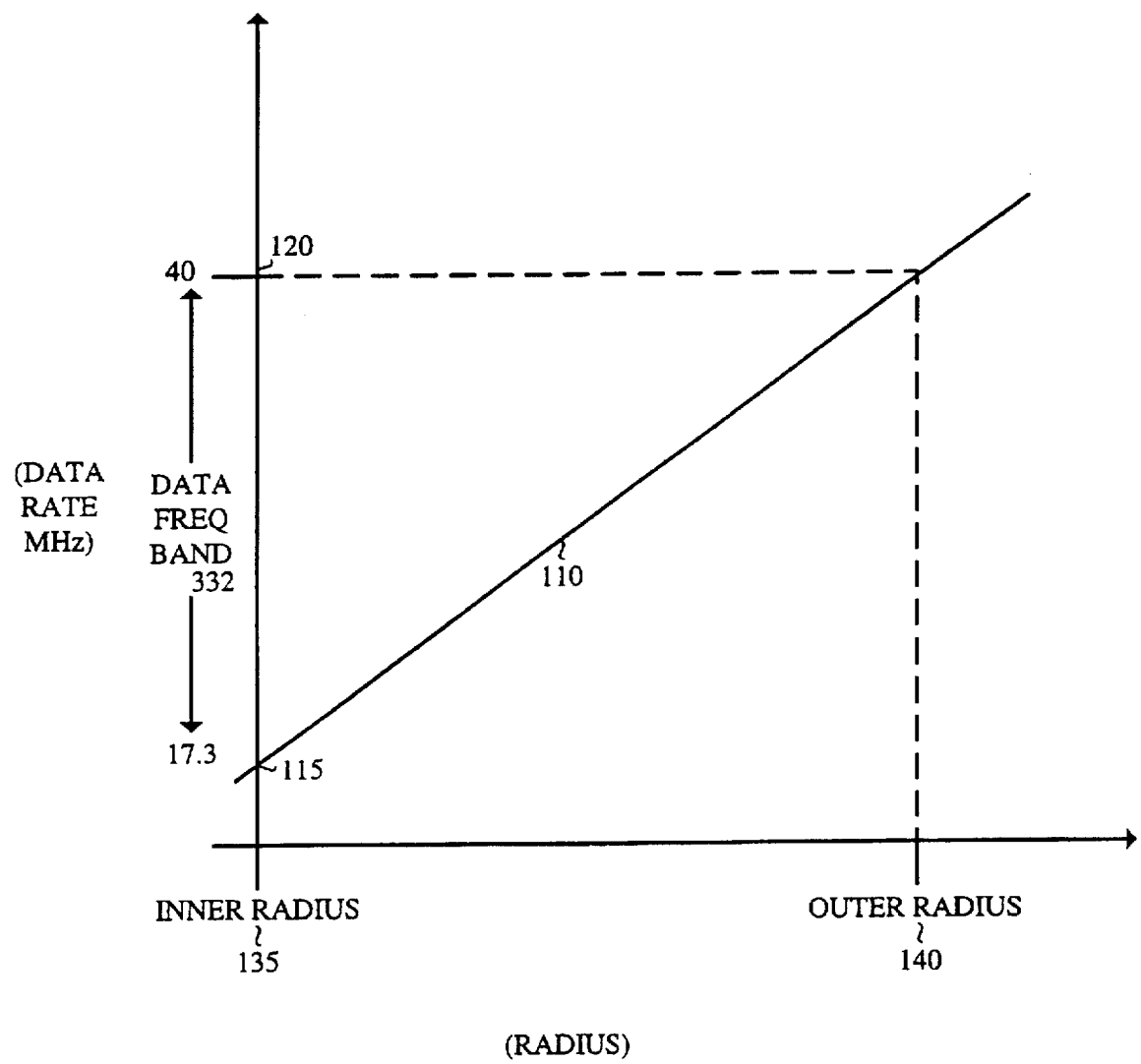
FIG. 2 is a graph illustrating data rate versus track radius from the inner tracks to the outer tracks of the present invention CD-ROM player using the constant angular velocity (CAV) reading technique.

The present invention data retrieval system is utilized in conjunction with a CD-ROM player that reads CD-ROM optical disks using the CAV reading technique; the CD-ROM optical disks being recorded with constant bit density (e.g., using the CLV recording format). FIG. 2 is a graph illustrating data rate (in MHz) versus read head track position of a CD-ROM player using the CAV reading technique. As shown by curve 110, the data rate at the read head of the CD-ROM player increases as the read head moves toward the outer tracks. In the CAV reading technique, because the rotation speed (measured in revolutions/sec) of the optical disk is fixed, as the read head travels across the tracks of the CD-ROM optical disk from the inner tracks to the outer tracks, the circumference of the tracks increases. The density (measured in bits/inch) of the information recorded in a track of an optical disk CD-ROM is constant. Due to the above, in the CAV reading technique, the amount of data encountered by the read head, per revolution, increases as the read head moves toward the outer tracks. Therefore, the data rate increases according to line 110 as the read head moves from the inner tracks (radius) 135 to the outer tracks (radius) 140. In the CAV reading technique, assuming the data rate for the inner track is $f_o$ and the inner radius is $r_o$, the following expression computes the data rate ($f_x$) for a track located at radius $r_x$:

$$f_x = \frac{r_x}{r_o} \times f_o \qquad (1)$$

In one exemplary embodiment of the present invention, the frequency at the inner track ($f_o$) is approximately 17.3 MHz and the frequency at the outer track is approximately 40 MHz. The data frequency band of FIG. 2 is between 17.3 MHz and 40 MHz. The inner track radius for a typical optical disk CD-ROM is approximately just under 1 inch. The outer track radius for a typical optical disk CD-ROM is approximately just under 2.4 to 2.5 inches. In this exemplary case, the CD-ROM player using the CAV reading technique is required to recognize and decode digital data that is detected within a very wide frequency range of from 17.3 MHz at the inner most tracks to 40 MHz at the outer most tracks; the higher frequency being roughly 2.5 times larger than the lower frequency or 250 percent of the lower frequency. It is appreciated that the above values are exemplary only and what is important is that in the CAV reading technique, the CD-ROM player needs to decode incoming data that has a very wide frequency range where the maximum frequency can be between 100 and 300 percent of the minimum frequency.

Given a fixed data density, D, measured in bits per inch (BPI), the following expression is used by one embodiment of the present invention to determine the data rate ($f_x$) of a track located at radius $r_x$ assuming a constant rotation period of T seconds per revolution:

$$f_x = D \times \frac{2 \times (PI) \times r_x}{T} \qquad (2)$$

where PI is 3.1415. In an exemplary embodiment, the data density, D, is constant throughout the CD-ROM optical disk and can be between 30,000–120,000 BPI, depending on the manufactured CD-ROM optical disk. Also, the angular rotation speed of the CD-ROM optical disk can be between 2,000–3000 revolutions per minute (rpm), so the period, T, can be between 0.03 and 0.02 seconds per revolution. It is appreciated that the above values are exemplary only and that the present invention can be applied to systems having different periods, T, and different data densities, D to those described above. It is appreciated that using the above expression (2), the data rate ($f_x$) of a track located at radius $r_x$ can be computed given a constant period, T (sec/rev), and given a constant data density, D (bits/inch). In the CAV reading technique, used by the present invention, both D and T are constants.

CD-ROM OPTICAL DISK 200

Figure 3:
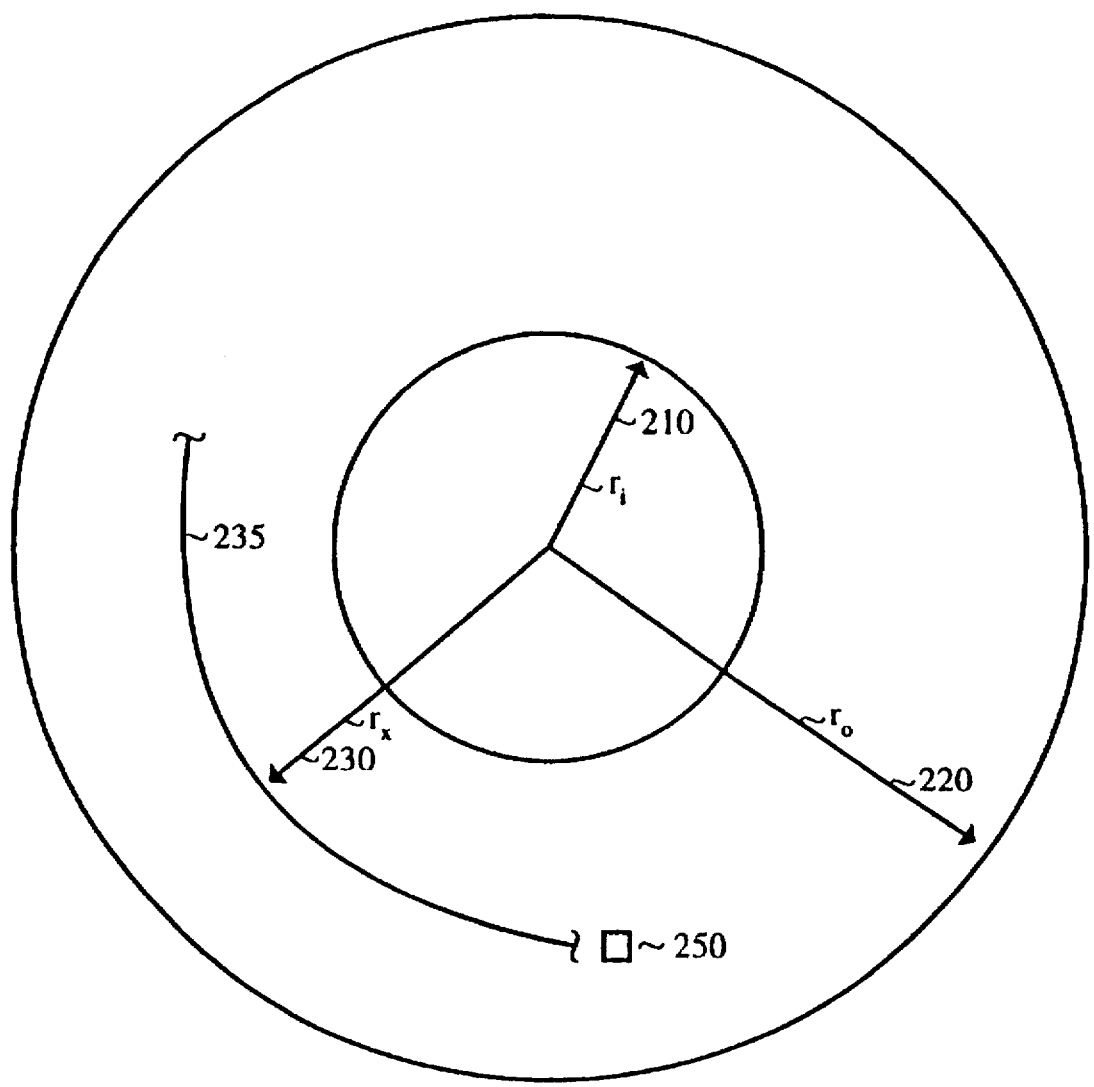
FIG. 3 illustrates tracks of a compact disk read only memory recording medium commonly referred to as an optical disk having annular (spiral) tracks of varying radius positions.

FIG. 3 illustrates an exemplary well known CD-ROM optical disk storage medium 200 as used by the present invention. The CD-ROM optical disk 200 is annular and consists of a series of concentric spiral annular shaped tracks, a portion of one track, $t_x$, 235 is shown at radius position $r_x$ 230. The inner most track located at radius position $r_i$ 210 is also shown as well as the outer most track located at radius position $r_o$ 220. The center of the CD-ROM optical disk 200 is typically empty. It is appreciated that $r_o$ can be as much as 2.5 times larger than $r_i$. As is well known, digital data is stored as optical "pits" within the tracks of the CD-ROM optical disk 200. Also shown in FIG. 3 is a CD-ROM optical read head ("read head") 250 which is positioned above and across the tracks of CD-ROM optical disk 200 in order to optically read the digital data stored therein. The read head 250 can also be disposed across the tracks of CD-ROM optical disk 200 during a seek command. In operation, the present invention utilizes well known components and methods to displace the read head 250 across the tracks of CD-ROM optical disk 200.

VARIABLE CENTER FREQUENCY DETERMINATION

As described in more detail below, the present invention utilizes a narrow capture band phase lock loop circuit to extract a read reference clock from the data read by the read head 250 at any given track position, $r_x$. The read reference clock represents the data rate of the digital information stored at that track position, $r_x$. In order to recover the read reference clock, the phase lock loop circuit requires an input reference clock signal, $f_i$, (also called a "center frequency").

Phase lock loop circuits can recognize an input clock signal as long as the input signal is located within the capture band of the phase lock loop circuit. The center frequency, $f_i$, is located in the middle of the capture band of the phase lock loop circuit. In the past, prior art CAV CD-ROM systems resorted to very large capture band phase lock loop circuits (e.g., capture bands where the maximum frequency is 100–300 percent of the minimum frequency) that are very expensive, very complex, typically custom designed, and usually in short supply.

The present invention utilizes a very narrow capture band phase lock loop circuit, but varies the center frequency ($f_i$) supplied to the narrow band phase lock loop circuit depending on the track position, $r_x$, of the read head 250. This allows the very narrow capture band phase lock loop circuit to recognize all data frequencies within an otherwise large data frequency band.

The manner of variation of center frequency to track position, $r_x$, depends on the number of center frequencies selected for the data frequency band. In one embodiment of the present invention, 256 center frequencies are selected over the data frequency band. However, the present invention is well suited for use with a number of different center frequencies (e.g., 8, 16, 32, 64, 128, etc.).

Figure 4:
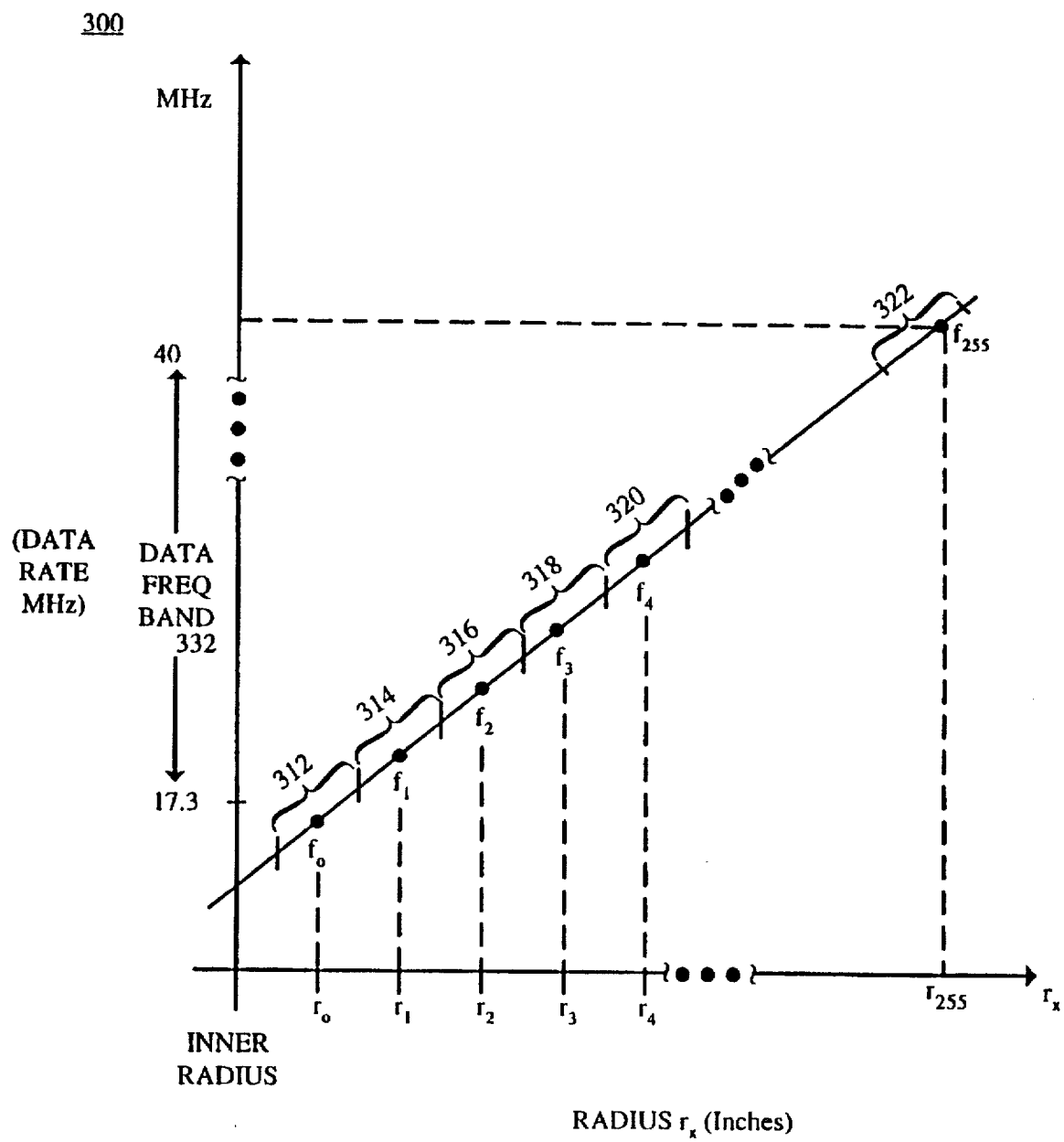
FIG. 4 is graph illustrating data rates versus track radius from the inner tracks to the outer tracks of an optical disk including exemplary microcontroller determined center frequencies of the present invention.

FIG. 4 is a graph illustrating data frequency (in MHz) versus track position (in inches) for an exemplary embodiment of the present invention that uses 256 center frequencies across the data frequency band 332 of a CAV CD-ROM player. FIG. 4 illustrates some exemplary center frequencies, $f_0$ to $f_{255}$, for corresponding read head track positions, $r_0$ to $r_{255}$, respectively. Each of the center frequencies, $f_i$, can be computed using expression (2) above, given its corresponding track position, $r_x$. The distance, d, between each track position, $r_x$, is computed by the below expression:

$$d = \frac{r_o - r_i}{n} \quad (3)$$

where $r_o$ is the outer track radius, $r_i$ is the inner track radius and n is the number of center frequencies (e.g., 256 in one example).

Each center frequency, $f_i$, is valid over a small data frequency range (e.g., center frequencies $f_0$ to $f_4$, correspond to frequency ranges 312, 314, 316, 318, and 320, respectively). For a given frequency range (e.g., 316), its corresponding center frequency (e.g., $f_2$) is located in the center of the frequency range. In one exemplary embodiment, given 256 possible frequency ranges with a corresponding 256 possible center frequencies, and a data frequency band of 40 MHz-17.3 MHz, each frequency range is approximately 88.67 kHz wide.

During a seek operation according to the present invention, when the current track position, $r_x$, of the read head is within a given frequency range (e.g., 312 or 314, etc.), the present invention computes the corresponding center frequency (e.g., $f_0$ or $f_1$, etc.) and supplies that determined center frequency value to the narrow capture band phase lock loop circuit. In this way, the center frequency supplied to the narrow capture band phase lock loop circuit is close to the actual data rate of the information stored at the current track position, $r_x$, of the read head. In this manner, the need for a wide capture band phase lock loop is eliminated within the present invention in lieu of a less expensive, readily available, narrow band phase lock loop circuit which is used to recover the read reference clock from the current track.

INFORMATION RETRIEVAL SYSTEM 500 WITH NARROW CAPTURE BAND PHASE LOCK LOOP CIRCUIT

Figure 5:
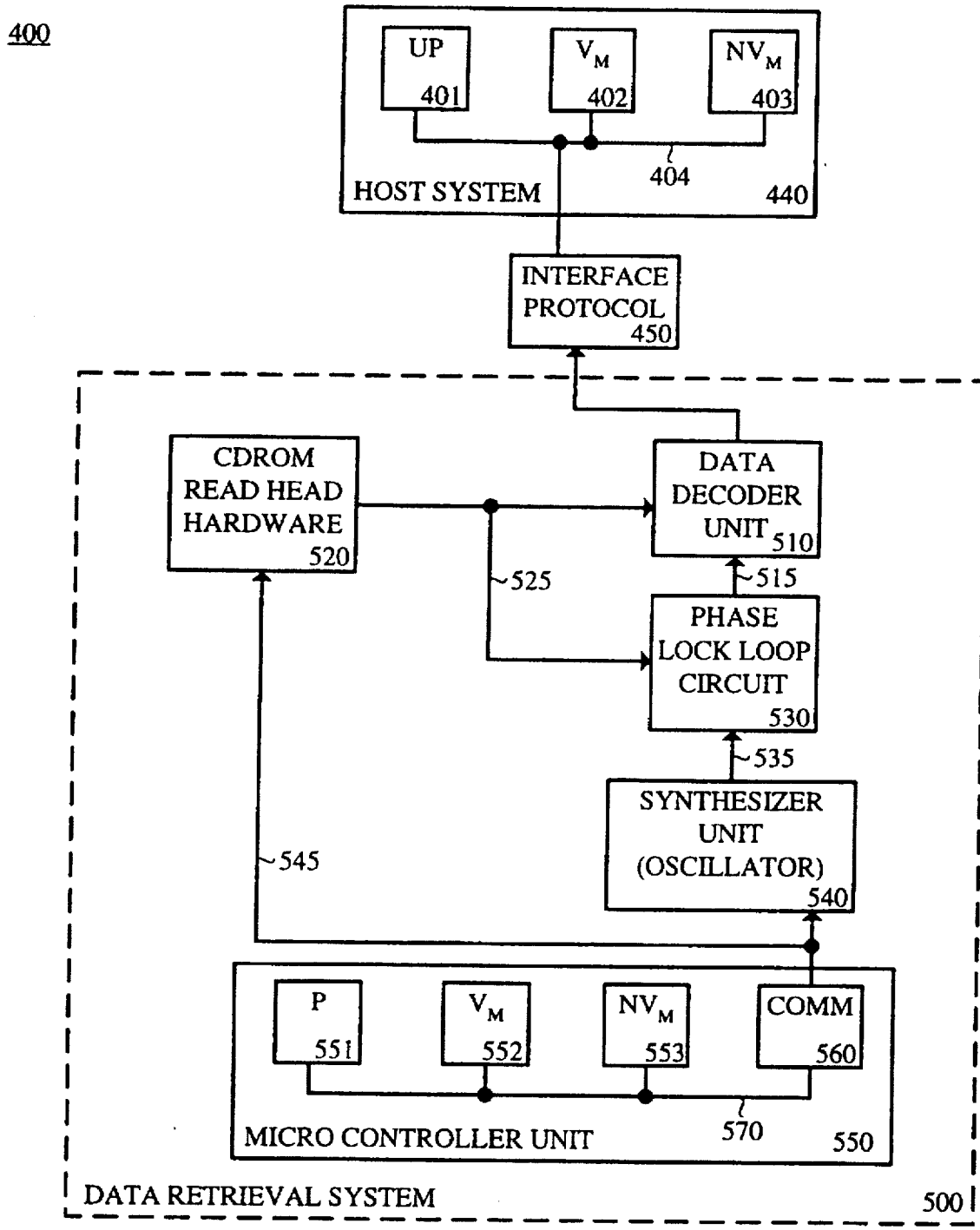
FIG. 5 is a block diagram illustrating a data retrieval system of the present invention for a constant angular velocity CD-ROM having microcontroller controlled center frequencies supplied to the phase lock loop circuit.

FIG. 5 illustrates an information retrieval system 500 of the present invention utilizing a narrow capture band phase lock loop circuit 530 as described above. The information retrieval system 500 is shown in conjunction with a host computer system 440 and an interface protocol unit 450 which together form larger computer system 400. As described further below, the narrow band phase lock loop circuit 530 receives variable center frequency signals over line 535. The value of the center frequency signal received over line 535 depends on the current track position, $r_x$, of the read head 250 as shown in FIG. 4.

In one embodiment of the present invention, data retrieval system 500 of FIG. 5 is a CD-ROM player coupled to communicate with host computer system 440. The host computer system 440 includes a processor 401 coupled to an address/data bus 404 which is also coupled to a volatile memory unit 402 (e.g., RAM) and a non-volatile memory unit 403 (e.g., ROM, PROM, EPROM, flash memory, etc.). A number of well known host computer systems can be used within the scope of the present invention. Also coupled to bus 404 is an interface protocol unit 450 that allows communication between the host computer system 440 and the information retrieval system 500. A number of well known protocol interface units can be used as unit 450 within the scope of the present invention. The host computer system 440 is responsible for issuing read commands to the data retrieval system 500. These read commands include seek operations that cause the read head 250 to position to particular track locations during the corresponding read operation. The host computer system 440 also receives decoded data from the data retrieval system 500 in response to the issued read commands.

Data retrieval system 500 of FIG. 5 includes a microcontroller unit 550 which is coupled to a CD-ROM read head hardware unit 520. The CD-ROM read head hardware unit 520 contains (1) an optical read head 250 as shown in FIG. 3, (2) a read head arm assembly for supporting the read head 250, and (3) a positioner (e.g., actuator) for controlling the position of the arm assembly, thereby controlling the position of the read head 250. A number of well known circuits and components can be used as CD-ROM read head hardware unit 520. As is well known, the CD-ROM read head hardware unit 520 responds to commands issued by microcontroller unit 550 which instruct the read head to position to determined track positions.

The microcontroller unit 550 controls various aspects of the data retrieval system 500 as described herein. Namely, the microcontroller unit 550 controls the position of the CD-ROM read head 250 with respect to the tracks of a CD-ROM disk 200 (FIG. 3). Commands from the microcontroller unit 550 are issued over control bus 545 to control CD-ROM read head hardware unit 520 to position the read head 250 to a specified track position, $r_x$. In this manner, the microcontroller unit 550 at all times is aware of the current track position of the read head 250. Within the scope of the present invention, many well known circuits and procedures can be used by and within microcontroller unit 550 to control the track position of the read head 250.

Microcontroller unit 550, like the host computer system 440, contains a processor 551 coupled to an internal address/data bus 570 which is also coupled to a volatile memory unit 552 (e.g., RAM) and a non-volatile memory unit 553 (e.g., ROM, PROM, EPROM, flash memory, etc.). A communication unit 560 is coupled to internal bus 570 and control bus 545 to allow processor 551 to issue commands over control bus 545. Program code controlling microcontroller unit 550 is stored in memory units 553 and 552 and is executed by processor 551.

Figure 6:
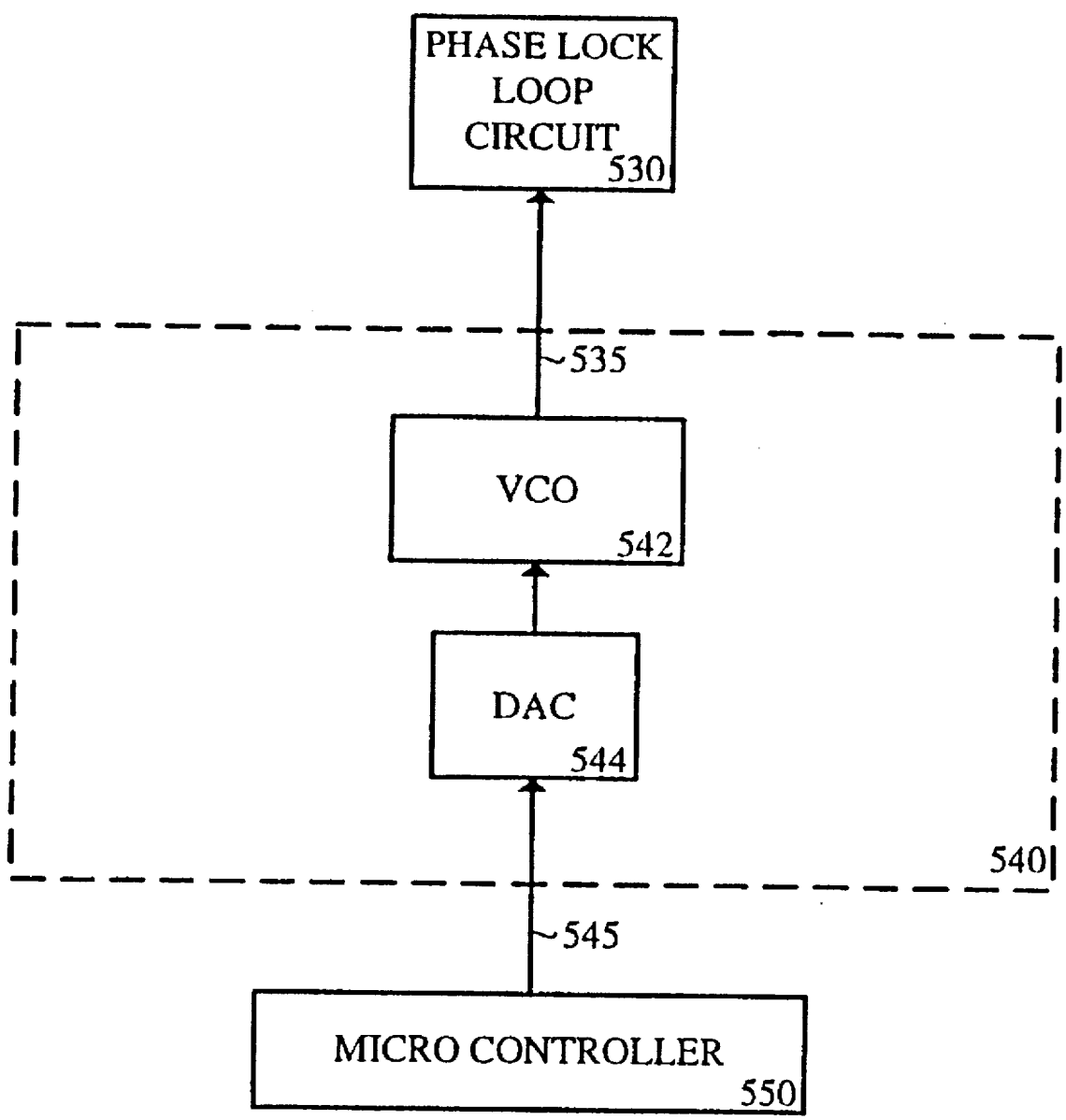
FIG. 6 is a block diagram of the programmable oscillator circuit of the present invention.

Microcontroller unit 550 is also coupled to a synthesizer unit 540 via control bus 545. Synthesizer unit 540 is a programmable oscillator circuit that when programmed with a particular value over bus 545 generates a corresponding frequency signal output over line 535. Under control of microcontroller unit 550, and based on the current track position of the read head 250, synthesizer unit 540 generates the programmable center frequencies (e.g., $f_1$, $f_2$, $f_3$, $f_4$) as described in FIG. 4. In one embodiment, synthesizer 540 receives an eight bit digital control signal over control bus 545 from processor 551 and therefore is capable of generating at least 256 different programmable center frequencies over line 535. Synthesizer circuit 540 can be realized utilizing a number of well known circuits within the scope of the present invention and one such implementation is shown in FIG. 6.

As shown in FIG. 5, the present invention utilizes a narrow capture band phase lock loop circuit ("phase lock loop circuit") 530 in order to extract a read reference clock from the data stored in the CD-ROM optical disk 200 at the current track position. The phase lock loop circuit 530 is coupled to receive a clock signal representing the programmable center frequency over line 535 as a reference clock signal. Phase lock loop circuit 530 is also coupled to receive data over bus 525 which is supplied by the CD-ROM read head hardware unit 520. Using the supplied variable center frequency signal, the phase lock loop circuit 530 is able to extract a read reference clock signal from the data supplied over bus 525. The manner in which a phase lock loop circuit extracts the phase and characteristics of an unknown clock signal (e.g., received over bus 525) with reference to a given center frequency signal (e.g., over line 535) is well known in the art. The narrow capture band phase lock loop circuit 530 can be realized utilizing a number of well known and readily available circuit designs.

Encoded data from the CD-ROM optical disk 200 as read by the read head 250 is transmitted over line 525 by the CD-ROM read head hardware unit 520. The extracted read reference clock is supplied by the phase lock loop circuit 530 to a data decoder unit 510 over line 515. The data decoder unit 510 uses the extracted read reference clock from line 515 to decode the encoded data received over bus 525 using well known techniques.

The width of the capture band required of the phase lock loop circuit 530 depends on the number of center frequencies utilized by the microcontroller unit 550. Assuming an-embodiment where 256 different center frequencies are used, the width of the capture band of the phase lock loop circuit is less than 1% of the total data frequency band 332 (FIG. 4). Table I below illustrates approximate values for the required capture band of the phase lock loop circuit for various embodiments of the present invention that use different numbers of center frequencies to divide the data frequency band 332.

TABLE I

| Number of Frequency Ranges Over Data Frequency Band | Required Width of Capture Band of Phase Lock Loop Circuit 530 |
| --- | --- |
| 8 | 31% of Data Frequency Band |
| 16 | 16% of Data Frequency Band |
| 32 | 8% of Data Frequency Band |
| 64 | 4% of Data Frequency Band |
| 128 | 2% of Data Frequency Band |
| 256 | 1% of Data Frequency Band |
| 512 | 0.5% of Data Frequency Band |
| 1024 | 0.25% of Data Frequency Band |

It is appreciated that the above embodiments are exemplary and the present invention is well suited for use with embodiments having different numbers of frequency ranges over the data frequency band 332 as those shown above. It is further appreciated that because the microcontroller unit 550 supplies variable center frequencies to the phase lock loop circuit 530, the present invention eliminates any need for an expensive, complex, and possibly custom designed wide band phase lock loop circuit as used in the past. Instead, a relatively inexpensive, readily available narrow band phase lock loop circuit can be used. According to one embodiment of the present invention, a narrow capture band phase lock loop circuit is one having a capture band wherein the maximum frequency value is greater than the minimum frequency value by less than 50%.

As discussed above, the extracted read reference clock signal is supplied over line 515 of FIG. 5 to a data decoder unit 510. Data decoder unit 510 is well known in the art. Because the read reference clock signal represents the data rate of the information stored at the current track position ($r_x$) of the read head 250, the data decoder unit 510 utilizes the read reference clock signal over line 515 to decode the incoming CD-ROM data from bus 525 into decoded digital words. During a read command from the processor 401 of the host computer system 440, these digital words are then transferred to the interface protocol unit 450 which places the data into a protocol that can be read by processor 401 over bus 404.

Read commands requiring a seek operation cause the microcontroller unit 550 to issue read head movement instructions to the CD-ROM read head hardware unit 520. In response thereto, the microcontroller unit 550 generates center frequency commands to the synthesizer unit 540 which alters the center frequency signal supplied to the phase lock loop circuit 530 depending on the track position of the read head 250. Center frequency adjustments are possible whenever the read head 250 moves.

FIG. 6 illustrates circuitry of the synthesizer unit 540 in more detail for an exemplary embodiment of the present invention. In one implementation, synthesizer 540 includes a digital to analog converter (DAC) 544 coupled to a voltage controlled oscillator (VCO) 542. The control bus 545 supplies a digital control signal or word (e.g., eight bits) from microcontroller unit 550 to the DAC 544. The DAC 544 converts this digital value into an analog voltage signal that is supplied to the VCO 542. The VCO 542 then generates the required center frequency ($f_i$) over line 535 to the phase lock loop circuit 530. The VCO 542 and the DAC 544 can be realized utilizing well known circuits within the scope of the present invention.

CENTER FREQUENCY ($f_i$) DETERMINATION

The microcontroller unit 550 of FIG. 5 controls the movement of read head 250 by issuing commands to the CD-ROM read head hardware 520. Upon power-up, the read head 250 is initialized to a known position. Therefore, at any given instant after power-up, the microcontroller unit 550 is aware of the current track position ($r_x$) of the read head 250. For any movement of the read head 250, the microcontroller unit 550 performs a center frequency determination to produce a valid center frequency control signal over bus 545. For an exemplary implementation, the period of rotation, T (sec/rev), is a constant and the data density, D (bits/inch), is also a constant. Further, for a given implementation, the number of center frequencies (e.g., 64, 128, 256, etc.) and their frequency values (e.g., $f_1, f_2, f_3, f_4$, etc.) are constants. Therefore, in one embodiment, microcontroller unit 550 uses relationship (2) to determine an approximate data frequency at the current read head position ($r_x$).

$$f_x = D \times \frac{2 \times (PI) \times r_x}{T} \quad (2)$$

In this embodiment, microcontroller unit 550 then determines the closest center frequency ($f_i$) to the determined value $f_x$. Processor 551 then generates a unique control signal over bus 545 to instruct the synthesizer unit 540 to generate the center frequency ($f_i$) determined above. It is appreciated that depending of the software procedure utilized, the microcontroller can directly compute the center frequency ($f_i$) based on a modified form of expression (2) that automatically rounds up or down to the nearest center frequency ($f_i$) based on the current track position $r_x$, of the read head 250.

In an alternative embodiment of the present invention, the microcontroller unit 550 utilizes a look-up table (LUT) 600 as shown in FIG. 7 to determine the center frequencies ($f_i$) for the current track positions, $r_x$, of the read head 250. In the exemplary embodiment of FIG. 7, 256 center frequencies are utilized and therefore the LUT contains 256 different entries. The LUT 600 is indexed by a number of index track positions ($r_i = r_0, r_1, r_2, r_3, \ldots, r_{256}$) equal to the number of center frequencies used. For each index track position ($r_i$), the LUT contains an entry for the corresponding center frequency ($f_0, f_1, f_2, f_3$, etc.) for that track position.

These index track positions can be viewed as track position "ranges" since they apply to all current read head track positions that are near them without being closer to an adjacent index track position within the LUT 600. For instance, in operation, the microcontroller receives the current track position of the read head 250 ($r_x$) and determines the closest index track position (of the indexed track positions ($r_i$) of the LUT 600) to the current read head track position ($r_x$). The corresponding center frequency ($f_i$) at the determined indexed track position ($r_i$) is then read out of the LUT 600 and provided to processor 551 for decoding and output over control bus 545. This alternative embodiment using the LUT 600 is advantageous because it does not require the processor 551 to perform multiplication and/or division operations in order to determine the proper center frequency during a seek command.

It is appreciated that the LUT 600 of FIG. 7 can be stored in computer readable volatile memory unit 552 or can be stored in computer readable non-volatile memory unit 553.

According to either of the above implementations, for a given current read head track position ($r_x$), microcontroller unit 550 determines a center frequency ($f_i$) that is relatively close to the actual data rate expected of the CD-ROM data stored at the current track position ($r_x$). Therefore, a phase lock loop circuit 530 (FIG. 5) with a narrow capture band can advantageously be used within the present invention.

PROCESS FLOW OF PRESENT INVENTION

Figure 8:
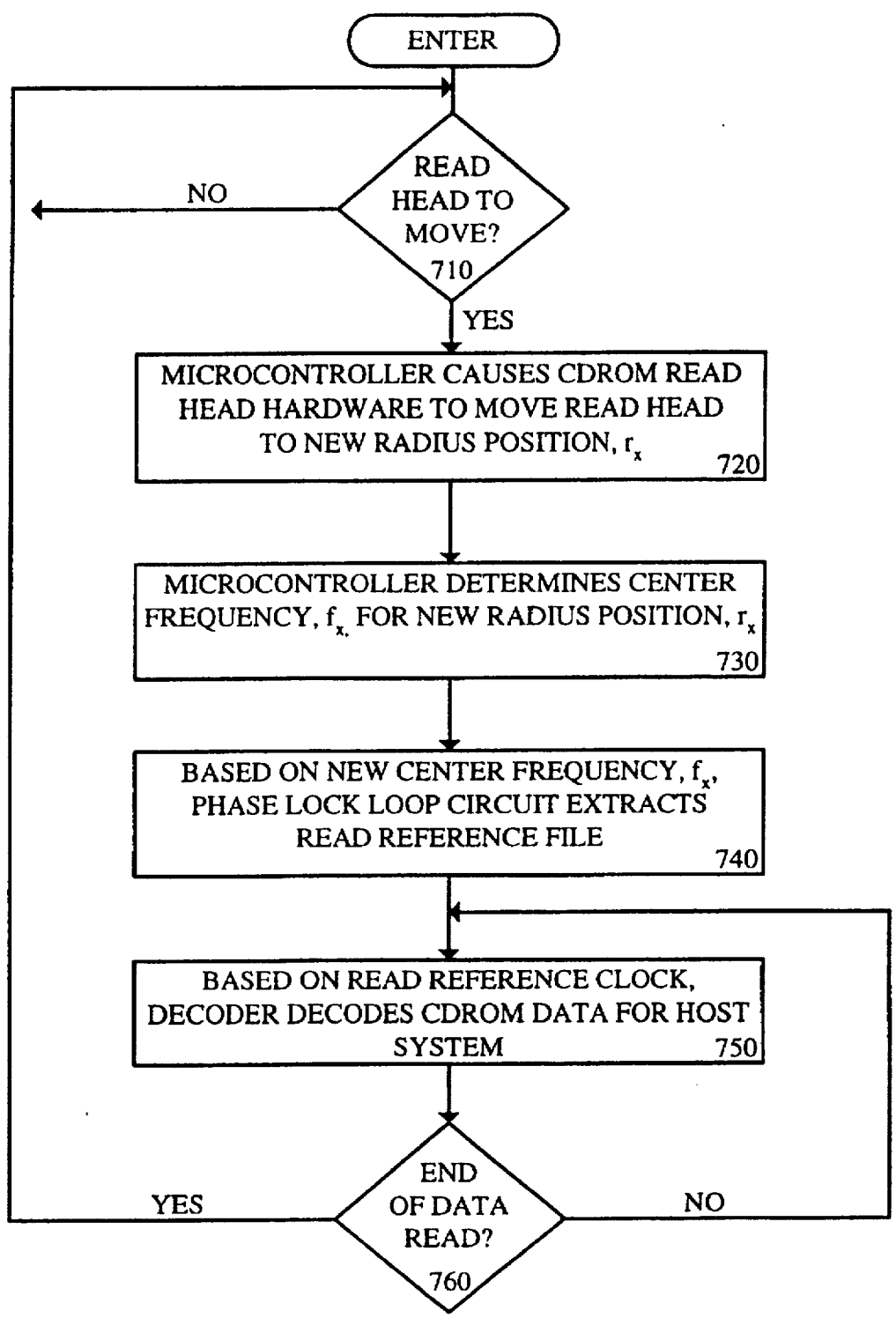
FIG. 8 is a process flow diagram illustrating steps used by the present invention data retrieval system of FIG. 5.

FIG. 8 illustrates steps of a process 700 performed by the present invention to recover data stored in a CD-ROM optical disk 200 using microcontroller generated center frequencies and a narrow capture band phase lock loop circuit 530. As discussed above, seek commands direct the read head 250 to displace across track positions of the CD-ROM optical disk 200. At step 710, if the read head 250 is instructed to move, then processing flows to step 720. At step 720, the microcontroller unit 550 causes CD-ROM read head hardware unit 520 to move read head 250 to the new track position ($r_x$) as instructed by the host processor 401. Upon the read head 250 reaching its target track position ($r_x$), it commences reading digital data stored at this position and supplies this encoded data over bus 525 at the data's current data rate. It is appreciated that step 720 can also be performed after step 730. A number of well known techniques can be used to perform step 720.

At step 730 of FIG. 8, the present invention directs the microcontroller unit 550 to determine a valid center frequency ($f_i$) for the current track position ($r_x$) of the read head 250. As described above, step 730 can be performed using either direct computation using expression (2) and then rounding to the nearest center frequency, or alternatively, can be performed using a look-up table (e.g., LUT 600). At the completion of step 730, the present invention determines a valid center frequency ($f_i$) based on $r_x$. The center frequency ($f_i$) is relatively close to the expected data rate of the CD-ROM information stored at the current read head track position, $r_x$.

At step 740, the present invention supplies the determined center frequency ($f_i$) to the narrow capture band phase lock loop circuit 530. Based on this center frequency ($f_i$), the narrow capture band phase lock loop circuit 530 extracts a read reference clock signal from the incoming CD-ROM data that is transmitted over bus 525. The extracted read reference clock signal represents the actual data rate of the information transmitted over bus 525. At step 740, the extracted read reference clock is supplied to data decoder unit 510.

At step 750 of FIG. 8, based on the read reference clock, the data decoder unit 510 decodes the data received over bus 525 to supply decoded digital words to the host computer system 440. A number of well known techniques can be used at step 750. At step 760, the present invention checks if the current read operation is complete. If not, processing returns to step 750 to continue decoding the recovered CD-ROM data from bus 525. Upon completion of the current read operation, process flow returns to step 710.

By utilizing the CAV reading technique, the rotation speed of the CD-ROM optical disk is constant. Therefore, the present invention can advantageously utilize a simple spindle motor design that does not require torque each time a seek command is issued, thereby reducing power consumption saving in the cost of the spindle motor design. Any of a number of well known constant rotation spindle motor designs can be used by the present invention. Further, by eliminating the need to alter the rotation speed, as done in CLV reading techniques, the present invention CAV CD-ROM provides a faster seek time. Lastly, by using a narrow capture band phase lock loop circuit 530, the present invention CAV CD-ROM avoids the high cost and complexity attributed to wide capture band phase lock loop circuits.

The preferred embodiment of the present invention, an information retrieval system for a CAV CD-ROM device using a narrow capture band phase lock loop circuit supplied with a variable center frequency that is computer controlled to be close to the data rate of the currently read track, is thus described. While the present invention has been described in particular embodiments, it should be appreciated that the present invention should not be construed as limited by such embodiments, but rather construed according to the below claims.

What is claimed is:

1. An information retrieval system comprising:
   a read head for optically reading encoded information of off an optical disk and for supplying said encoded information, said encoded information read and supplied at variable data rates depending on track positions of said read head;
   a microcontroller for controlling said track positions of said read head and for determining variable center frequencies based on said track positions;
   a programmable oscillator coupled to said microcontroller for generating said variable center frequencies determined by said microcontroller;
   a narrow capture band phase lock loop circuit coupled to receive said variable center frequencies from said programmable oscillator and coupled to receive said encoded information, said narrow capture band phase lock loop circuit for extracting read reference clock signals from said encoded information; and
   a data decoder circuit coupled to receive said encoded information and coupled to receive said read reference clock signals, said data decoder circuit for generating decoded information based on said encoded information and said read reference clock signals.

2. An information retrieval system as described in claim 1 wherein said optical disk is a CD-ROM optical disk.

3. An information retrieval system as described in claim 1 wherein said encoded information is digital information.

4. An information retrieval system as described in claim 1 wherein said microcontroller comprises:
   a processor coupled to a bus;
   a memory unit coupled to said bus; and
   wherein said microcontroller utilizes direct computation to determine said variable center frequencies based on said track positions of said read head.

5. An information retrieval system as described in claim 1 wherein said microcontroller comprises:
   a processor coupled to a bus;
   a memory unit coupled to said bus and containing a look-up table storing variable center frequency values indexed by track positions; and
   wherein said microcontroller utilizes said look-up table stored in said memory unit to determine said variable center frequencies based on said track positions of said read head.

6. An information retrieval system as described in claim 1 wherein said programmable oscillator comprises:
   a digital to analog converter receiving digital center frequency commands from said microcontroller and generating voltage level signals representative of said digital center frequency commands; and
   a voltage controlled oscillator coupled to receive said voltage level signals from said digital to analog converter and based thereon for generating said variable center frequencies.

7. An information retrieval system as described in claim 1 wherein for a given variable center frequency supplied to said narrow capture band phase lock loop circuit, the frequency of a read reference clock signal corresponding to said given variable center frequency is close to said given variable center frequency.

8. An information retrieval system as described in claim 1 further comprising a host computer system for issuing read head seek commands to said microcontroller to displace said read head over said optical disk and for receiving said decoded information from said data decoder circuit.

9. A circuit for extracting a read reference clock from encoded digital data recorded on a CD-ROM optical disk, said encoded digital data supplied at variable data rates from a read head reading tracks of said CD-ROM optical disk, said circuit comprising:
   a microcontroller for controlling track positions of said read head and for determining a variable center frequency based on a given track position, wherein said variable center frequency is determined to be close in frequency to a data rate of encoded digital data stored at said given track position;
   a programmable oscillator coupled to said microcontroller for generating said variable center frequency determined by said microcontroller; and
   a narrow capture band phase lock loop circuit coupled to receive said variable center frequency from said programmable oscillator and coupled to receive said encoded digital data, said narrow capture band phase lock loop circuit for extracting said read reference clock signal from said encoded digital data at said given track position based on said variable center frequency.

10. A circuit as described in claim 9 wherein said microcontroller comprises:
    a processor coupled to a bus;
    a memory unit coupled to said bus; and
    wherein said microcontroller utilizes direct computation to determine said variable center frequency based on said given track position of said read head.

11. A circuit as described in claim 9 wherein said microcontroller comprises:
    a processor coupled to a bus;
    a memory unit coupled to said bus and containing a look-up table storing variable center frequency values indexed by track positions; and
    wherein said microcontroller utilizes said look-up table stored in said memory unit to determine said variable center frequency based on said given track position of said read head.

12. A circuit as described in claim 9 wherein said programmable oscillator comprises:
    a digital to analog converter receiving a digital center frequency command from said microcontroller and generating a voltage level signal representative of said digital center frequency command; and
    a voltage controlled oscillator coupled to receive said voltage level signal from said digital to analog converter and based thereon for generating said variable center frequency.

13. A circuit as described in claim 9 further comprising a data decoder circuit coupled to receive said encoded digital data from said read head and coupled to receive said read reference clock signal from said narrow capture band phase lock loop circuit, said data decoder circuit for generating decoded digital data based on said encoded digital data and said read reference clock signal.

14. In a CD-ROM information retrieval system, a method of determining read reference clock signals, said method comprising the steps of:
    reading variable data rate encoded information of off an optical disk, said step of reading performed by a read head;
    controlling track positions of said read head and determining variable center frequencies based on said track positions, said above steps of controlling and determining performed by a microcontroller circuit;
    generating said variable center frequencies determined by said microcontroller using a programmable oscillator;
    extracting read reference clock signals from said encoded information based on said variable center frequencies, said step of extracting performed using a narrow capture band phase lock loop circuit coupled to receive said variable center frequencies from said programmable oscillator and coupled to receive said variable data rate encoded information from said read head.

15. A method as described in claim 14 further comprising the steps of:
    generating decoded information based on said encoded information and said read reference clock signals, said step of generating performed using a data decoder circuit coupled to receive said encoded information and coupled to receive said read reference clock signals; and
    supplying said decoded information to a host computer system.

16. A method as described in claim 15 wherein said optical disk is a CD-ROM optical disk and wherein said encoded information is digital information.

17. A method as described in claim 15 wherein said step of determining variable center frequencies based on said track positions comprises the step of determining said variable center frequencies utilizing direct computation based on said track positions of said read head.

18. A method as described in claim 15 wherein said step of determining variable center frequencies based on said track positions comprises the step of determining said variable center frequencies utilizing a look-up table stored in a memory device and indexing said look-up table based on said track positions of said read head to obtain said variable center frequencies.

* * * * *